Dec. 18, 1928.  
F. HYMANS ET AL  
1,695,690

ELEVATOR PLATFORM

Filed April 22, 1927

Frederick Hymans
Carl T. Wuthin } INVENTORS
BY Walter S. Bradley ATTORNEY

Patented Dec. 18, 1928.

1,695,690

UNITED STATES PATENT OFFICE.

FREDERICK HYMANS, OF YONKERS, NEW YORK, AND CARL T. WESTLIN, OF WEST-FIELD, NEW JERSEY, ASSIGNORS TO OTIS ELEVATOR COMPANY, OF NEW YORK, N. Y., A CORPORATION OF NEW JERSEY.

ELEVATOR PLATFORM.

Application filed April 22, 1927. Serial No. 185,794.

This invention relates to platforms, and particularly to elevator platforms having movable floors.

One feature of the invention is to provide a platform of the above character wherein the floor is constrained to move in a vertical direction only.

Another feature of the invention resides in the provision of a platform of the above character wherein the threshold plate moves with the movable floor.

A third feature of the invention is to provide a platform of the above character wherein the floor may be arranged to move only upon the application of a load of a desired magnitude.

Still another feature of the invention resides in the provision of a platform of the above character wherein the friction of the movable parts is reduced to a minimum and which is positive and noiseless in operation.

Other features and advantages will become apparent from the specification, taken in connection with the accompanying drawings wherein one embodiment of the invention is illustrated.

In the drawings:—

Figure 1:
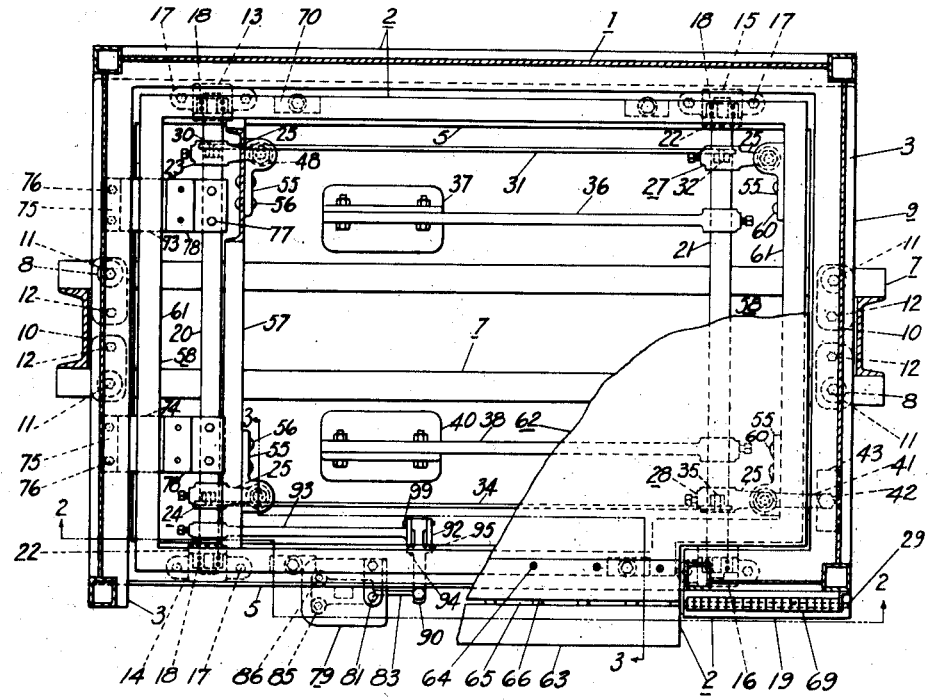
Figure 1 illustrates an elevator car having a platform provided with a movable floor, parts of the car and platform being broken away.
Figure 2:
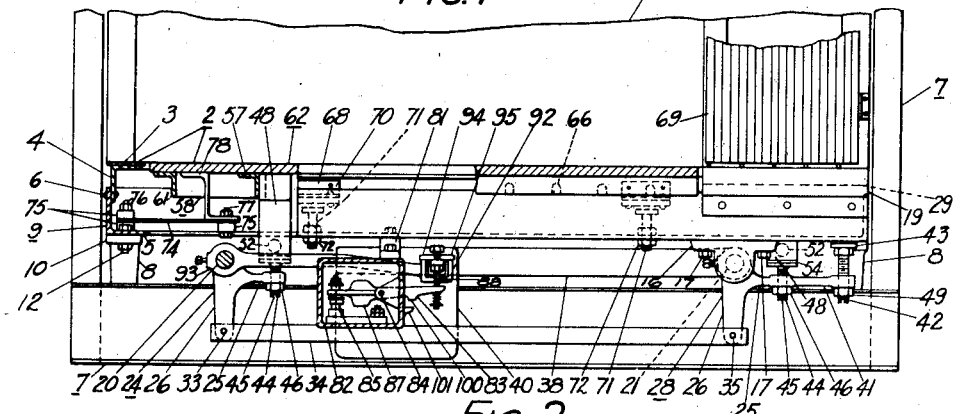
Figure 2 is a view taken along the line 2—2 of Figure 1.

Referring to Figures 1 and 2 an elevator car 1 has a platform 2. The frame 9 of the platform 2 is composed of a floor plate 3 and angle bars 4 and 5 extending around the edge of the platform. Floor plate 3 is secured as by screws to the angle bar 4 and angle bars 4 and 5 are secured together by rivets 6. The platform frame 9 is supported upon the car frame 7 by means of posts 8. Posts 8 have lugs 10 formed on their upper ends. Bolts 11 extend through aligned apertures provided in the car frame 7, in the posts 8 and in the angle bar 5. Bolts 12 extend through aligned apertures provided in the lugs 10 of the posts 8 and in the angle bar 5. Bolts 11 and 12 retain the platform frame 9 and therefore the car 1 in fixed position with respect to the car frame 7.

Bearing housings 13, 14, 15 and 16 are secured by bolts 17 to the underside of the frame 9 of platform 2. Bolts 17 extend through apertures provided in these bearing housings and in the angle bar 5. Self-aligning ball bearings 18 are positioned within the bearing housings 13, 14, 15 and 16. Ball bearings 18 within bearing housings 13 and 14 support the reduced ends of a shaft 20. Ball bearings 18 within bearing housings 15 and 16 support the reduced ends of a shaft 21. Washers 22 are positioned on the shafts 20 and 21 adjacent the bearing housings and serve to retain lubricant within these housings, insuring the continued lubrication of the self-aligning ball bearings 18.

A bell crank lever 23 is positioned near one end of the shaft 20 and another bell crank lever 24 is positioned near the other end of this shaft. Bell crank levers 23 and 24 are keyed to the shaft 20 and are alike in construction. These levers have a downwardly extending arm 26 and an arm 25 extending at right angles to the arm 26. Bell crank levers 27 and 28, similar to bell crank levers 23 and 24, are keyed to the shaft 21. The downwardly extending arm 26 of the bell crank lever 23 is pivotally connected to one end of a horizontally extending link 31 by means of a pin 30 extending through aligned apertures provided in these members. The other end of link 31 is pivotally connected to the downwardly extending arm 26 of the bell crank lever 27 by means of a pin 32 extending through aligned apertures in these members. Similarly, the downwardly extending arm 26 of the bell crank lever 24 is pivotally connected by a pin 33 to one end of a horizontally extending link 34. The other end of link 34 is pivotally connected by a pin 35 to the downwardly extending arm 26 of bell crank lever 28. The links 31 and 34 tie the bell crank levers and their shafts together so that any motion of one bell crank lever is transmitted to the other bell crank levers and causes them to have similar motions.

Figure 3:
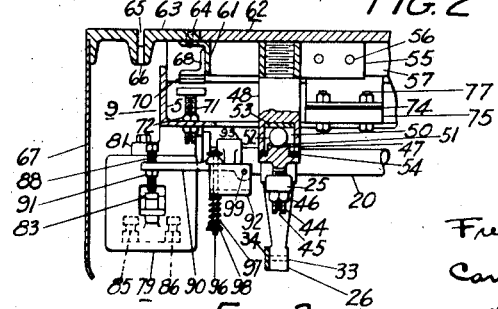
Figure 3 is a view taken along line 3—3 of Figure 1, said view being turned through ninety degrees so as to illustrate the car floor in a horizontal position.

The arms 25 of bell crank levers 23, 24, 27 and 28 are provided with apertures through which screws 44 are threaded. The shanks of screws 44 are provided with slots 45 arranged to receive the end of a screw-driver so that each of these screws may be adjusted with respect to its respective arm 25. Lock nuts 46 are threaded on the screws 44 and engage the arms 25, thereby securing the screws 44 in a fixed position with respect to these arms. The heads of the screws 44 have portions 47 that extend within recesses 50 (see Figure 3) provided in four stud members 48. The portions 47 of the screws 44 are provided with seats 51 of spherical contour. Hardened balls 52 are positioned within the recesses 50 and rest upon the seats 51 of the screws 44. Hardened disks 53 are positioned at the inner ends of the recesses 50 and rest upon the balls 52. Washers 54, of felt or other suitable material, are carried by the heads of the screws 44 and seal the outer ends of the recesses 50 so that lubricant may be retained within these recesses.

The upper ends of the four stud members 48 are reduced in diameter and are threaded into apertures provided in four brackets 55. Two of the brackets 55 are secured by rivets 56 to an angle bar 57 that constitutes a part of a floor frame 58. The other two brackets 55 are secured by rivets 60 to an angle bar 61 also constituting a part of the floor frame 58. The movable floor 62 is carried by the floor frame 58.

An extension 41 is formed on the arm 25 of the bell crank lever 28. A screw 42 is threaded through an aperture provided in the extension 41 and abuts against a buffer 43 of cushioning material secured to the angle bar 5. A lock nut 49 is threaded on the screw 42 and secures this screw in fixed position with respect to the extension 41. A weight lever 36 is keyed to the shaft 21 adjacent the bell crank lever 27. A counterbalance weight 37 is secured to the free end of weight lever 36. Counterbalance weight 37 comprises a casing that contains any desired amount of heavy material such as steel punchings. A weight lever 38 is keyed to the shaft 21 adjacent the bell crank lever 28. A counterbalance weight 40, of the same construction as counterbalance weight 37, is secured to the end of weight lever 38. Counterbalance weights 37 and 40 tend to cause shafts 20 and 21 to revolve in a counterclockwise direction as viewed in Figure 1, the motion of these shafts, however, being limited by screw 42 abutting the buffer 43.

The weight of the movable floor 62 is transmitted through the four stud members 48 to the hardened balls 52 that are carried by the arms 25 of the bell crank levers 23, 24, 27 and 28. The weight of the movable floor 62 tends to cause these bell crank levers and their shafts 20 and 21 to turn in a clockwise direction as viewed in Figure 1. The counterbalance weights 37 and 40 counteract this tendency, however, and maintain screw 42 in engagement with buffer 43. The screw 42 is adjusted with respect to the extension 41 so that with no load on the movable floor 62 the surface of this floor is flush with the upper surface of the floor plate 3. All parts of the surface of the movable floor 62 are made level with the upper surface of the floor plate 3 by adjusting the screws 44.

A threshold plate 63 is secured by screws 64 to the movable floor 62 and extends over the frame 9 of platform 2. The angle bar 4 is cut away where the threshold plate 63 extends over the frame 9 so as to give clearance between the threshold plate and the frame 9. The threshold plate 63 is provided with a guide slot 65 for guiding the bottom of the car gate 69. With the exception of a few small connecting portions 66 the guide slot 65 extends the full depth of the threshold plate 63. Since the guide slot 65 extends all the way through the threshold plate, this guide slot is self cleaning and cannot collect dirt. A toe guard 67 is secured by screws to the outer edge of the threshold plate 63. A track plate 19 is secured to the platform frame 9 and is provided with a guide slot 29 in alignment with the guide slot 65 in the threshold plate 63. Guide slot 29 is also arranged to guide the bottom of the car gate.

Four spaced angle pieces 68 are riveted to the floor frame 58. Buffers 70 are secured to the bottom of the angle pieces 68. Four screws 71 are threaded through apertures provided in the angle bar 5 of platform 2 and have flat heads positioned below the buffers 70. The shanks of screws 71 are slotted at their ends for the purpose of receiving a screw driver for adjusting the screws with respect to the buffers 70. Lock nuts 72 are threaded on the screws 71 at opposite sides of the angle bar 5 and secure the screws 71 in fixed position with respect to the platform 2.

Two thin horizontally extending rectangular plates 73 and 74 of strong yet resilient material, such as spring steel, extend between the frame 9 of platform 2 and the movable floor 62. The outer ends of these plates are rigidly secured by clamping blocks 75 and bolts 76 to the frame 9. The bolts 76 extend through aligned apertures provided in the angle bar 5, clamping blocks 75 and plates 73. The inner ends of plates 73 are rigidly secured by clamping blocks 75 and bolts 77 to a Z-bar 78. Z-bar 78 is riveted to the movable floor 62.

A bracket 81 is bolted to the bottom of the angle bar 5 of the frame 9 of platform 2. Bracket 81 carries a switch housing 82 of a switch 79. A switch lever 83 is pivoted upon a pin 84 mounted in the switch housing 82. Switch lever 83 carries two movable contacts that are arranged to cooperate with two stationary contacts, these pairs of cooperating contacts being designated 85 and 86. Pairs of contacts 85 and 86 may be included in various control circuits for the elevator car operating motor. For example, in the case of a push button elevator system where it may be desired to operate the car while there are no passengers in the car and with the car gate open, one of these pairs of contacts may be placed in a circuit that is parallel with the circuit of the car gate contacts. Also in this case the other of these pairs of contacts may be arranged in the hall push button circuit.

A weight 87 formed on the switch lever 83, biases the pairs of contacts 85 and 86 to engaged position. A stop shoulder 100 formed on the switch lever 83 is arranged to engage a lug 101 extending from the switch housing 82 and thereby limit the extent of separation of the pairs of contacts 85 and 86. The switch lever 83 is arranged to be actuated by a screw 88 that is adjustably threaded through an aperture provided in an arm 90. A lock nut 91 serves to secure the screw 88 in its adjusted position with respect to the arm 90. Arm 90 is pivoted upon a pin 99 that is carried by the bifurcated end 92 of a lever 93. Lever 93 is keyed to shaft 20. The arm 90 is provided with shoulders 94 and 95. A headed pin 96 extends through an aperture in the arm 90 and through an aperture in the end 92 of lever 93. A compression spring 97 surrounds a portion of the pin 96 and bears at one end against a washer 98 carried by the pin 96 and at its other end against the end 92 of lever 93. Spring 97 tends to hold the shoulders 94 and 95 of arm 90 in engagement with the upper surfaces of this bifurcated end 92. The end of screw 88 just touches the end of switch lever 83 when the surface of the movable floor 62 is level with the upper surface of the floor plate 3 and the cooperating pairs of contacts 85 and 86 are in engagement.

When a load is placed upon the movable floor 62, or upon the threshold plate 63, there is a tendency for this floor to move downwardly under the weight of the load, causing the bell crank levers 23, 24, 27 and 28 and shafts 20 and 21 to turn in a clockwise direction and effect the upward swinging of the counterbalance weights 37 and 40. The magnitude of the load that is sufficient to cause total weight of the counterbalance weights 37 and 40. As the weight of the counterbalance weights 37 and 40 may be varied as desired, the load necessary to cause the downward movement of the floor may be determined to suit the requirements of any particular installation.

The weights 37 and 40 may be such that when a single passenger steps into the car, the floor 62 moves downwardly, or these weights may be of such magnitude as to require a number of passengers to enter the car before this movement of the floor 62 takes place. In freight service these weights may be made such as to require a load of considerable magnitude to be placed upon the movable floor before it moves. As the floor 62 moves downwardly under the action of a sufficient load, the screw 42 moves away from the buffer 43. The turning of shaft 20 causes lever 93 to swing downwardly. Arm 90 moves with lever 93 and causes screw 88 to move switch lever 83 so as to effect the separation of the pairs of cooperating contacts 85 and 86. The movement of switch lever 83 is limited by its stop shoulder 100 engaging lug 101. Any further movement of the lever 93, after switch lever 83 comes to rest, causes arm 90 to turn about its pivotal pin 99 so that shoulders 94 and 95 of this arm move away from the bifurcated end 92 of lever 93 compressing spring 97.

The floor 62 and threshold plate 63 are brought to rest by the buffers 70 striking the flat heads of screws 71. The buffers 70 cushion this stopping action so that no jar is felt within the car.

Inasmuch as there are but few movable parts in the operating mechanism connecting the movable floor and the switch lever 83 of switch 79 and as these parts have relatively large bearing surfaces, there is practically no lost motion in the operation of switch 79 by movement of the movable floor. Screws 71, therefore, may be adjusted so that the floor 62 has only a slight downward movement in operating this switch. This slight downward movement of the movable floor 62 causes a corresponding deflection of the plates 73 and 74. Owing to the thinness of the plates they do not resist this downward movement. Any tendency of the movable floor 62 to shift in any direction in a horizontal plane, however, is entirely prevented by these plates. Thus a person stepping into the empty car is not made uneasy as there is no side motion of the floor 62 and as the downward movement thereof is so slight as not to be noticeable.

When the load is removed from the movable floor, the weights 37 and 40 act to move this floor upwardly until the screw 42 again abuts against the buffer 43. During this upward movement of the movable floor the lever 93 swings upwardly permitting the switch lever 83, of switch 79, to move so as to effect the re-engagement of the pairs of contacts 85 and 86.

Owing to the use of the self-aligning ball bearings 18, the force required to turn the shafts 20 and 21 is reduced to a minimum. Any tendency for these shafts to deflect, due to the weight of the movable floor and its load or to the presence of the weights 37 and 40, is permitted by bearings 18 without increasing the frictional resistance of these bearings. The use of the hardened balls 52 and their associated parts reduces the friction between the bell crank levers 23, 24, 27 and 28 and the movable floor to a minimum. Inasmuch as the frictional resistance of the operating mechanism connecting the movable floor to the switch lever 83 of switch 79 is reduced to a minimum, the weights 37 and 40 may be made such as to permit the downward movement of the movable floor upon the slightest load being applied to this floor.

The use of the hardened balls 52 permits the movable floor to move in a truly vertical direction unaffected by the angular motion of the bell crank levers and without any possibility of binding taking place between the stud members 48 and the bell crank levers.

An unevenly distributed load applied to the movable floor, as for example a person standing on the threshold plate 63, causes the entire movable floor to move downwardly so that it is always parallel to its original unloaded position, owing to the action of the links 31 and 34 which cause all of the bell crank levers to move together.

Inasmuch as the movable floor 62 is constrained to move in a vertical direction thereby insuring the constant alignment of guide slots 65 and 29 and as the connecting portions 66 of the threshold plate 63 are positioned so as to be below the bottom of the gate 69, even though there is no load on the movable floor 62, the gate 69 may be moved irrespective of the vertical position of the movable floor 62 and without interfering with the operation of the floor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A platform for an elevator car comprising, a frame, a floor and a threshold forming the edge of said platform at the entrance of the elevator car and being rigid with respect to said floor, said floor and said threshold being movable as a unit with respect to said frame.

2. A platform for an elevator car comprising, a frame, a floor supported from said frame, and a threshold plate rigidly secured to said floor, said floor and said threshold plate being movable with respect to said frame.

3. A platform for an elevator car comprising, a frame, a movable floor, means for supporting said movable floor from said frame, and means for limiting the movement of said movable floor to a vertical direction, said last named means comprising a member rigidly secured at one end to said frame and at its other end to said movable floor.

4. A platform for an elevator car comprising, a movable floor, a threshold plate secured to said movable floor, and means for preventing horizontal shifting of said movable floor and said threshold plate with respect to the car.

5. A platform for an elevator car comprising, a frame, a movable floor, a threshold plate secured to said movable floor, and means connecting said frame to said movable floor, said connecting means permitting only vertical movement of said movable floor and said threshold plate with respect to said frame.

6. A platform for an elevator car comprising, a frame, a switch carried by said frame, a movable floor, a threshold plate rididly secured to said floor, and mechanism connecting said movable floor to said switch and arranged, upon movement of said floor and threshold plate with respect to said frame, to cause the operation of said switch.

7. A platform for an elevator car comprising, a frame, a switch carried by said frame, a floor arranged to move in a vertical direction, a threshhold plate secured to said floor, and mechanism connecting said movable floor to said switch and arranged upon movement of said floor and threshhold plate, with respect to said frame, to cause the operation of said switch.

8. A platform for an elevator car comprising, a frame, a switch carried by said frame, a movable floor, a threshold plate secured to said floor, a member connecting said movable floor to said frame, said member limiting the movement of said floor to a vertical direction, and mechanism connecting said movable floor to said switch and arranged, upon movement of said floor and threshold plate with respect to said frame, to cause the operation of said switch.

9. A platform for an elevator car comprising, a movable floor, a frame, self-aligning bearings carried by said frame, a shaft mounted in said bearings, and levers secured to said shaft and acting to support said movable floor, said floor, when moving, acting through said levers to turn said shaft in said bearings.

10. A platform for an elevator car comprising, a movable floor, a frame, self-aligning bearings carried by said frame, shafts mounted in said bearings, levers secured to said shafts and supporting said movable floor, and links connected to said levers, said movable floor being arranged to act through said levers to turn said shafts in said bearings while said links cause levers to move in unison.

11. A platform for an elevator car comprising, a frame, self-aligning bearings carried by said frame, shafts mounted in said bearings, levers secured to said shafts, links connecting said levers for causing said levers to move in unison, a movable floor carried by said levers, and weighted levers secured to one of said shafts for counterbalancing the weight of said movable floor, said weighted levers being arranged to swing upwardly and permit the movable floor to move downwardly upon the application of a load to said movable floor.

12. A platform for an elevator car comprising, a frame, self-aligning antifriction bearings secured to said frame, shafts supported by said bearings, bell crank levers secured to said shafts, links extending between and pivotally connected to certain arms of said bell crank levers for causing said levers to move in unison, a movable floor antifrictionally supported upon the other arms of said bell crank levers and arranged when moving to act through said bell crank levers to cause said shafts to turn in said bearings, a plate secured at one end to said frame and at its other end to said movable floor and arranged, upon movement of the movable floor, to limit such movement to a vertical direction.

13. A platform for an elevator car comprising, a frame, self aligning antifriction bearings secured to said frame, shafts supported by said bearings, bell crank levers secured to said shafts, links extending between and pivotally connected to certain arms of said bell crank levers for causing said levers to move in unison, a movable floor antifrictionally supported upon the other arms of said bell crank levers and arranged when moving to act through said bell crank levers to cause said shafts to turn in said bearings, a threshold plate carried by said movable floor, and plates secured to said frame and to said movable floor and arranged, upon movement of the movable floor, to limit such movement to a vertical direction.

14. A platform for an elevator car comprising, a frame, self aligning antifriction bearings carried by said frame, shafts supported in said bearings, a switch operatively connected to one of said shafts, bell crank levers secured to said shafts, links extending between and pivotally connected to certain arms of said bell crank levers for causing said levers to move in unison, a movable floor antifrictionally supported upon the other arms of said bell crank levers and arranged when moving downwardly under the influence of a load, to act through said bell crank levers to cause said shafts to turn in said bearings and effect the operation of said switch, stop means for limiting the downward movement of said floor, a weight connected to one of said shafts and tending to turn said shafts so as to cause the movable floor to move upwardly, stop means for limiting the upward movement of said movable floor, and plates secured to said frame and to said movable floor and arranged, upon movement of the movable floor, to guide said floor so that it moves only vertically.

15. A platform for an elevator car comprising, a frame, a horizontal floor movable vertically with respect to said frame and maintained horizontal during such movement, and means for preventing shifting of said movable floor horizontally with respect to said frame.

In testimony whereof, we have signed our names to this specification.
FREDERICK HYMANS.
CARL T. WESTLIN.

CERTIFICATE OF CORRECTION.

Patent No. 1,695,690.  Granted December 18, 1928, to

FREDERICK HYMANS ET AL.

It is hereby certified that error appears in the printed specification of the above numbered patent requiring correction as follows: Page 3, lines 49 and 50, strike out "The counterbalance weights 37 and 40", and line 51, after the word "cause" insert the words "movement of these parts depends upon the"; page 4, lines 81 and 82, claim 6, for the misspelled word "rididly" read "rigidly"; same page, line 123, claim 10, after the word "cause" insert the word "said"; and that the said Letters Patent should be read with these corrections therein that the same may conform to the record of the case in the Patent Office.

Signed and sealed this 19th day of March, A. D. 1929.

(Seal)

M. J. Moore,
Acting Commissioner of Patents.